United States Patent [19]
Faroudja et al.

[11] Patent Number: 5,159,451
[45] Date of Patent: Oct. 27, 1992

[54] FIELD MEMORY EXPANSIBLE LINE DOUBLER FOR TELEVISION RECEIVER

[76] Inventors: Yves C. Faroudja, 26595 Anacapa Dr., Los Altos Hills, Calif. 94022; Charles A. Bialo, 1155 Donington Dr., San Jose, Calif. 95129

[21] Appl. No.: 671,478

[22] Filed: Mar. 19, 1991

[51] Int. Cl.$^5$ .................. H04N 7/01; H04N 7/18
[52] U.S. Cl. .................. 358/140; 358/105; 358/12
[58] Field of Search ............ 358/140, 105, 141, 11, 358/12

[56] References Cited

U.S. PATENT DOCUMENTS

| | | | |
|---|---|---|---|
| 4,400,719 | 8/1983 | Powers | 358/140 |
| 4,670,775 | 6/1987 | Faroudja et al. | 358/36 |
| 4,785,351 | 11/1988 | Ishikawa | 358/140 |
| 4,791,487 | 12/1988 | Kozuki et al. | 358/140 |
| 4,876,596 | 10/1989 | Faroudja | 358/140 |
| 4,941,045 | 7/1990 | Birch | 358/140 |
| 4,967,271 | 10/1990 | Campbell et al. | 358/105 |
| 4,982,280 | 1/1991 | Lyon et al. | 358/105 |
| 4,989,090 | 1/1991 | Campbell et al. | 358/140 |
| 5,016,103 | 5/1991 | Rabii | 358/11 |

Primary Examiner—John K. Peng

[57] ABSTRACT

A scan line doubler includes an input for receiving a video signal at a first scan rate, an output for providing a video signal at a second scan rate twice the first scan rate, a main path leading between the input and the output. The main path includes a scan line interpolation circuit for averaging pixels over two adjacent lines, a two-to-one scan line compression circuit for compressing original and interpolation scan lines into a scan line doubled format, and an optional additive path insertion location between the line interpolation circuit and the two-to-one line compression circuit. An openable connection path bridging the optional additive path insertion location is replaceable with an additive signal processing path including a field delayed pixel extraction circuit, a control circuit for generating a control in relation to detection of motion within the main path video signal, and a combining circuit responsive to the control for adding to the main path the one field delayed pixels and subtracting the line interpolated pixels, whereby when the optional path is connected, the scan line doubler operates in the horizontal, vertical and temporal domain, and when the optional path is not connected, the scan line doubler operates in the horizontal and vertical domains. An improved and simplified three-dimensional scan line doubler is an aspect of the present invention.

38 Claims, 10 Drawing Sheets

FIG. 7
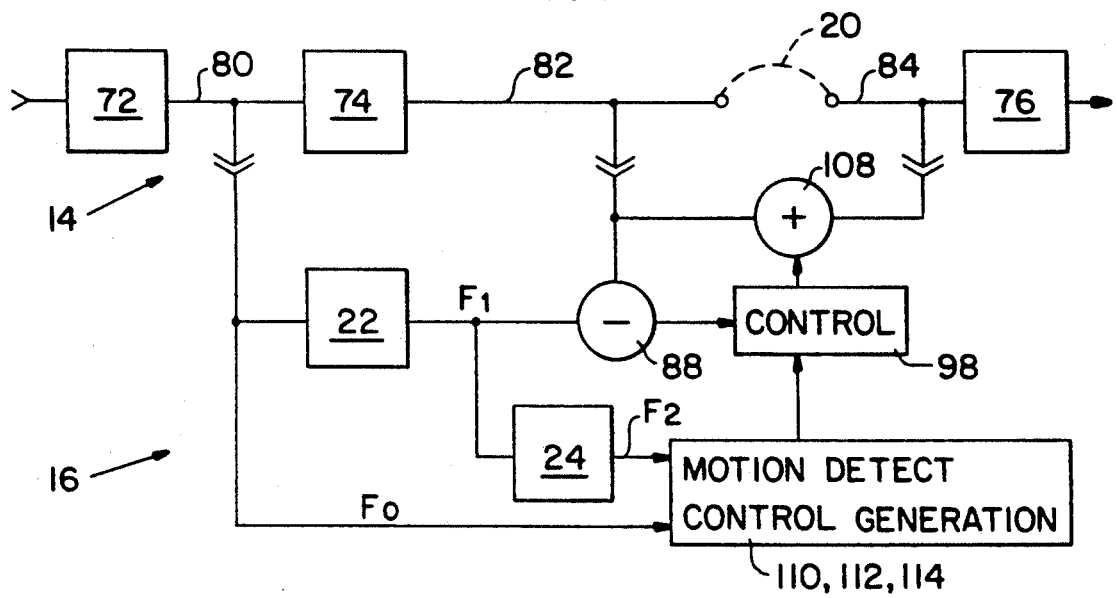
FIG. 8A
(NO MOTION)
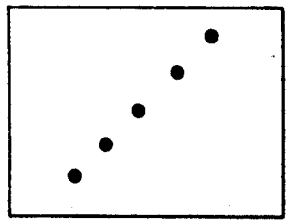
FIG. 8B
(MOTION)
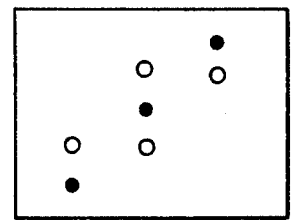
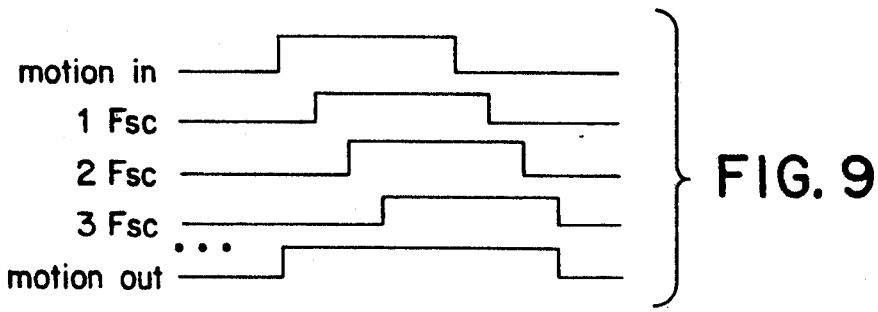
FIG. 9

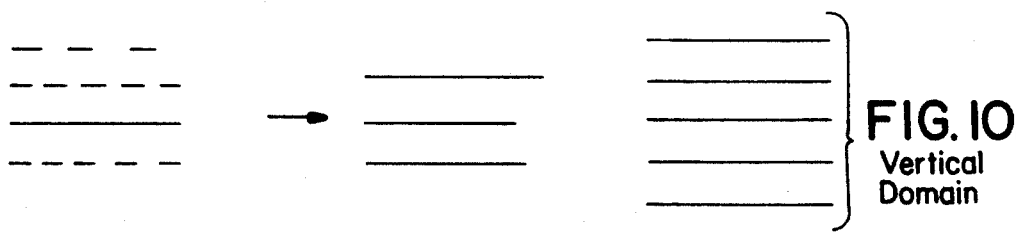
FIG. 10A
Vertical Domain
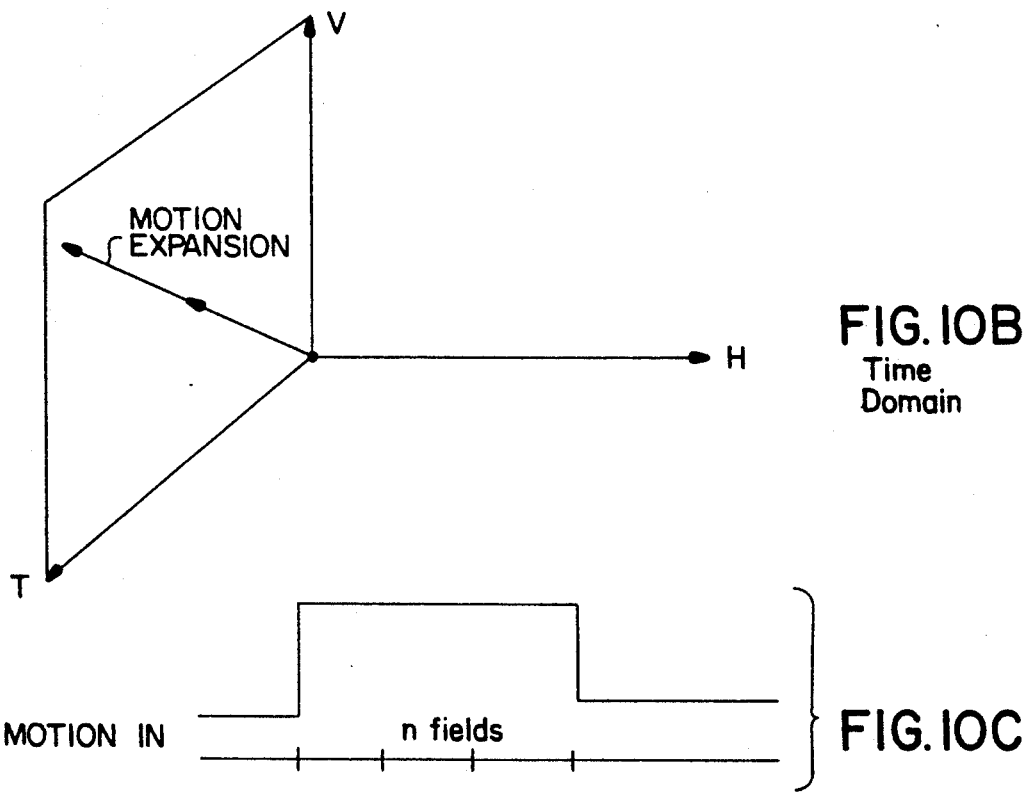
FIG. 10B
Time Domain
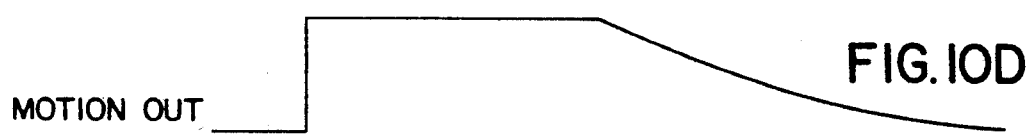
FIG. 10C
FIG. 10D

FIELD MEMORY EXPANSIBLE LINE DOUBLER FOR TELEVISION RECEIVER

FIELD OF THE INVENTION

The present invention relates to television signal processing methods and apparatus. More particularly, the present invention relates to a field memory expansible line doubler for a television receiver, enabling a very low cost limited performance two-dimensional line doubler to be enhanced to a three-dimensional line doubler with increased performance, merely by adding field memories to the doubler.

BACKGROUND OF THE INVENTION

Television receivers are available in a wide variety of sizes and capabilities, including picture quality. As picture quality and/or picture display size increases, the cost of the television receiver increases. While there are some portions of a television receiver which are essential to detect and decode the picture for display and separate the sound for reproduction, there are other portions of the receiver (herein referred to as a "decoder") which, if present, enhance overall performance thereof.

It is therefore most useful to provide a decoder for a television receiver which is comprised of plural modules, at least some of which are entirely optional to satisfactory picture display. In one minimum, very inexpensive configuration, for example, the decoder may include just enough signal processing equipment to provide a minimum, yet adequate picture quality. Such a decoder might be appropriate for a television receiver having a small picture display size, such as a fourteen inch diagonal dimension. By simply adding modules to the decoder, a very high quality display would be provided for a large picture display size, such as 50 inches.

It is known that the visual appearance of a television display, particularly that of a large dimension display, is enhanced by doubling the number of horizontal scanning lines. In large dimension displays, the line scan structure becomes a visible and objectionable picture artifact which distracts from the aesthetic quality of the picture display. As the display format is reduced, the line scan structure becomes less objectionable, but can be seen, particularly upon high contrast, high quality displays, such as the Sony Trinitron TM display. By doubling the number of scanning lines at the receiver, the line scan structure becomes much less visible.

Scan line doubling is only one enhancement of a plurality of known enhancements which may be applied at the television receiver in order to improve the quality of the picture display. Noise reduction and crispening are also known enhancements.

A scan line doubler generates additional scan lines, based upon the picture content of the original scan lines. Line averaging is a known approach. With line averaging, a new pixel is generated as an average of a pixel value at the same spatial region or area of two adjacent scan lines A and B. The resultant average pixel, typically $(A+B)/2$, is then placed on a new line generated in the space between the two original lines A and B.

There are known drawbacks to spatial averaging within line doublers. First, there is a loss of vertical and diagonal resolution. Second, there is a resultant flickering, which becomes very perceptible at high transitional levels, such as those above 50 IRE units. These problems are addressed and a very satisfactory solution is presented by the disclosure contained in a commonly assigned U.S. Pat. No. 4,989,090, entitled "Television Scan Line Doubler Including Temporal Median Filter", the disclosure of which is hereby incorporated by reference. However, the scan line doubler described in the referenced U.S. Patent did not lend itself to low cost implementation for the television consumer marketplace, and the temporal dimension processing was not modularized or "optional", thereby providing expansibility of the processing capability at the television decoder. The present invention can be considered to be a significant improvement in aspects of the approach taken in the above-referenced U.S. Patent.

SUMMARY OF THE INVENTION WITH OBJECTS

A general object of the present invention is to provide a minimum acceptable performance, two-dimensional line doubler for a television receiver which may be readily expanded to a motion adaptive three-dimensional line doubler by generating an additive correction path and correction signal added to a main path of the two-dimensional line doubler.

Another general object of the present invention is to provide a two-dimensional line doubler for a television receiver which may be expanded to a three-dimensional line doubler by adding field memory units in an additive circuit path to a main path process of the two-dimensional line doubler.

A still further general object of the present invention is to provide an improved and circuit-simplified additive path three-dimensional line doubler including an improved control circuit implementing a variable switchover threshold for switching from field delayed spatially aligned pixels to average pixels in accordance with the threshold which varies smoothly in function of the motion activity in the picture, thereby preserving main fine picture details when motion is slow or limited in area, and also minimizing perceptible flicker and other artifacts otherwise incident to the pixel interpolation process.

One more general object of the present invention is to provide a scan line doubler for a television receiver which is modular, which provides satisfactory performance in a minimum configuration without field memory units, and which provides superior performance as a three dimensional scan line doubler when an additive path including field memory units are added.

Yet another object of the present invention is to provide a scan line doubler which is readily implemented with digital electronics in one or a few large scale integrated circuit chips, and which operates in a minimum configuration in two dimensions without digital field memory units, and which operates in an expanded configuration in three dimensions when digital field memory units are added.

In accordance with the present invention, a field memory expansible scan line doubler is provided for a television receiver. Essentially, the basic scan line doubler includes:

an input for receiving a video signal at a first scan rate, an output for providing a video signal at a second scan rate twice the first scan rate, a main path leading between the input and the output and including:

a scan line interpolation circuit for interpolating pixels in accordance with the relation (A+B)/2 wherein A is a first location along a first scan line, and B is a second location along a second scan line substantially aligned vertically with the first location and for putting out line interpolated pixels in accordance with said relation, a two-to-one scan line compression circuit for compressing original and interpolation scan lines into a scan line doubled format, and an optional additive path insertion location between the line interpolation circuit and the two-to-one line compression circuit, and a removable connecting path for bridging the optional additive path insertion location.

As one aspect of the present invention, the scan line doubler is enhanced by opening of the removable connecting path and an additive signal processing path is connected at the optional additive path insertion location. The additive signal processing path includes:

a field delayed pixel extraction circuit including a field memory unit for providing one field delayed pixels substantially spatially coincident with the line interpolated pixels located spatially between the first and second scan line, a control circuit for generating a control in relation to detection of motion within the main path video signal, and a combining circuit responsive to the control for adding to the main path a function of the one field delayed pixels minus the line interpolated pixels in accordance with the said relation, whereby when the optional path is connected, the scan line doubler operates in the horizontal, vertical and temporal domain, and when the optional path is not connected, the scan line doubler operates in the horizontal and vertical domains.

As a related aspect of the present invention the combining circuit combines a result of addition of said one field delayed pixels minus said line interpolated pixels, the result being subjected to a threshold function circuit for applying a threshold function varying in relation to magnitude of the control put out by the control circuit such that a high threshold level is applied when magnitude of the control is high, and a low threshold is applied when magnitude of the control is low.

As a further related aspect of the present invention the additive path of the scan line doubler includes plural plug-in field memory units.

As another related aspect of the present invention, when the plural plug-in field memory units are installed in the additive path, the removable connecting path is automatically opened across the optional additive path insertion location.

In another aspect of the present invention the combining circuit comprises a subtractor for generating a function of one field delayed pixels minus the line interpolated pixels in accordance with the said relation, and an adder for adding the function to the main path in accordance with the absence or presence of the control.

As related aspects of the present invention, the control may be a one bit binary logic function or a multi-step control function whose magnitude varies in relation to detected magnitude of motion within the video. The control may further be generated in function of detection of transition magnitude within the video signal, and inhibited unless above a predetermined threshold, such as about 25 IRE units transition magnitude.

As an independent aspect of the present invention, the scan line doubler processes a luminance component of a color video signal in the main path, and processes chrominance components of the color video signal by providing:

an input for receiving plural chroma signal components at a first scan rate, an output for providing chroma signal components at a second scan rate twice the first scan rate, a chroma line doubling path leading between the input and the output and including:

a chroma line interpolation circuit for interpolating chroma pixels in accordance with the relation (A+B)/2 wherein A is a first location along a first scan line, and B is a second location along a second scan line substantially aligned vertically with the first location and for putting out line interpolated pixels in accordance with said relation, a two-to-one line chroma scan line compression circuit for compressing original and interpolation chroma scan lines into a scan line doubled format and for supplying said compressed original and interpolation chroma scan lines to said chroma output.

As another aspect of the present invention, the scan line doubling function is carried out digitally, and the scan line doubler further comprises analog to digital converter circuitry connected to said input, and digital to analog converter circuitry connected to said output, and wherein said main path comprises digital electronics. In this aspect, the additive path also comprises digital electronics, including plural plug-in digital field memory units.

In another aspect of the present invention, the control circuitry includes a motion detection circuit. In this regard, the additive path includes two tandem-connected plug-in field memory units, a first memory unit providing 263 line period delay at the first scan rate, and a second memory unit providing 262 line period delay at the first scan rate, the first memory unit included within the field delayed pixel extraction circuit for providing one field delayed pixels substantially spatially coincident with the line interpolation pixels located spatially between the first and second scan line; and, the first and second memory units included within the motion detection circuit for detecting motion in the video signal on a frame by frame basis.

In closely related aspects of the present invention, the motion detection circuit includes a full wave rectifier function in order to remove the sign of the control in function of direction of motion detected in the video signal. The motion detection circuit may further include a low pass filter, a horizontal domain expansion circuit, and/or a vertical/temporal domain expansion circuit.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings:

FIG. 7 is a simplified block diagram of the FIG. 1 circuit.

FIG. 8A is a graph of a picture image display showing operational characteristics of the FIGS. 1 and 7 circuitry in the absence of motion.

FIG. 8B is a graph of a picture image display showing operational characteristics of the FIGS. 1 and 7 circuitry in the presence of motion.

FIG. 9 is a set of waveforms showing extension in the horizontal or line scan domain of a motion control signal in accordance with operation of the FIGS. 1 and 7 circuit.

FIGS. 10A-10D are a series of graphs illustrating operation of a vertical and temporal domain expansion circuit of the FIGS. 1 and 3 circuits with FIG. 10A showing vertical expansion of the motion control signal, FIG. 10B showing a three dimensional vector plot of the motion control signal lying in a vertical/temporal plane, FIG. 10C showing an incoming motion control signal in the vertical/temporal domain, and FIG. 10D showing the effect of temporal recirculation in order to expand the motion control in the vertical/temporal domain.

DETAILED DESCRIPTION OF A PREFERRED EMBODIMENT

Figure 1:
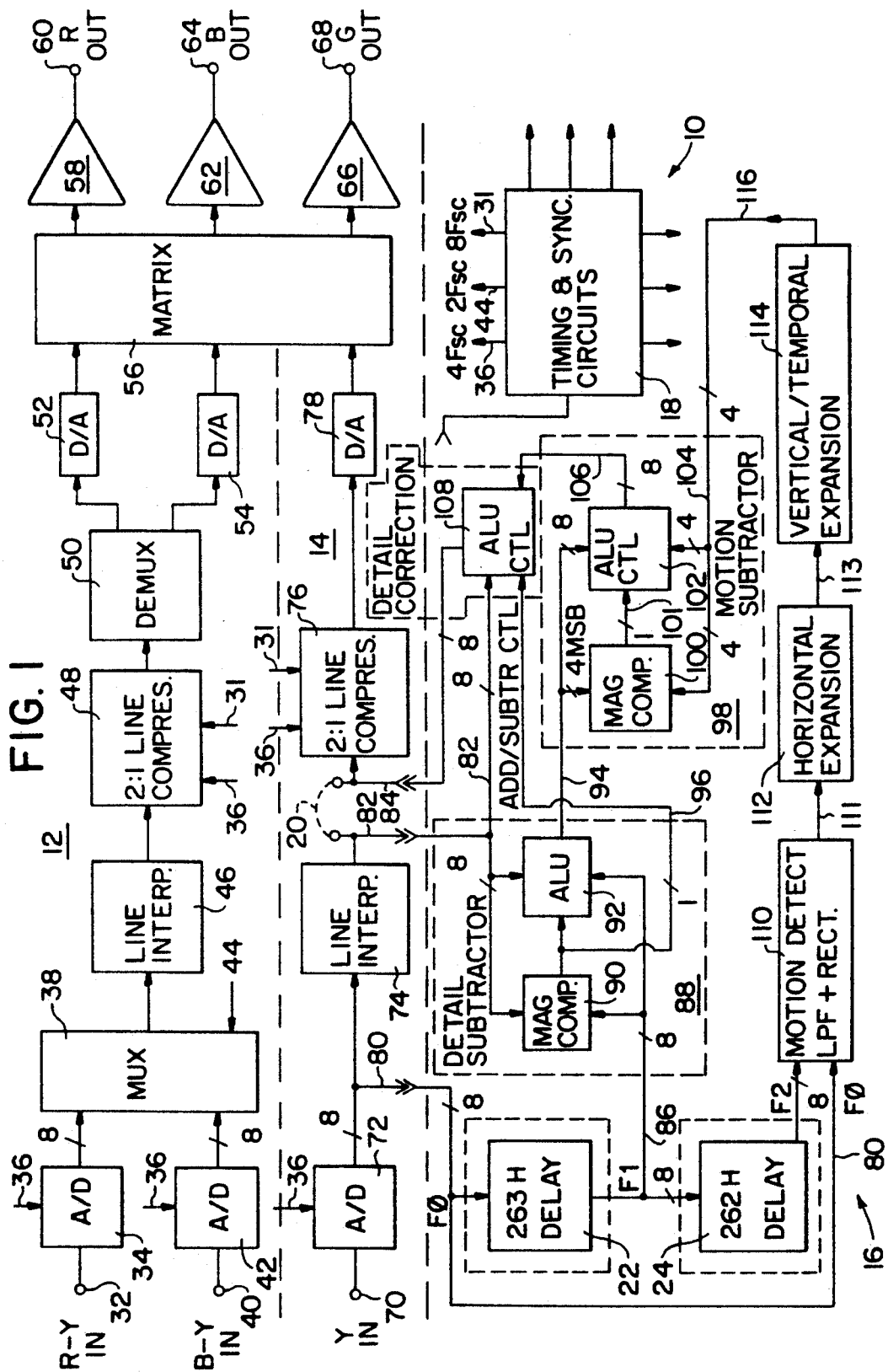
FIG. 1 is a block diagram of a modular, field memory expansible scan line doubler for a television receiver in accordance with principles of the present invention.

With reference to the FIG. 1 overall block diagram a modular, field memory expansible scan line doubler 10 includes a main path spatial domain line doubler including a chroma section 12 and a luminance section 14, and further includes a temporal domain expansion circuit 16 and timing and sync processing circuitry 18. A jumper 20 shown in dashed lines in FIG. 1 enables the expansion circuit 16, and particularly the field delay memory elements 22 and 24 thereof, to be bypassed and eliminated without destroying the functionality of the section 14. Thus, by the expedient of removing the jumper 20 and installing the memories 22 and 24, the spatial domain line doubler 14 is expanded to become a three dimensional line doubler 10 in accordance with principles of the present invention.

The chroma section 12 of the spatial line doubler includes a red minus luminance (R−Y) input 32 leading through an analog to digital converter 34. The converter 34 converts the R−Y component into eight bit digital quantization values at a sampling rate of four times the color subcarrier frequency (4Fsc) in accordance with a 4Fsc clock signal supplied over a line 36 from the timing and sync circuitry 18. The quantized R−Y signal is then supplied as one input of a two-input multiplexer 38. A blue minus luminance (B−Y) input 40 passes through an analog to digital converter 42, also quantizing at the 4Fsc rate and into the multiplexer 38. Given the color coding convention, the R−Y and B−Y values alternate at a rate twice the frequency of the color subcarrier (2Fsc). The 2Fsc signal is generated by the timing and sync circuit 18 and supplied to the multiplexer 38 over a line 44.

The multiplexed R−Y, B−Y chroma bytes output from the multiplexer 38 are fed into a scan line interpolator circuit 46 which operates to derive (A+B)/2 average pixels from the incoming scan lines. The original and the interpolation scan lines are then sent to a two-to-one line compression circuit, which receives scan lines at the original scan line rate and which puts them out at two times the original scan line rate. The scan line doubled lines are then passed through a demultiplexer 50 which demultiplexes the R−Y and B−Y color components. The R−Y component is then converted to analog in a digital to analog converter 52, and the B−Y component is then converted to analog in a digital to analog converter 54. These two components are then fed into a conventional color decoding matrix 56 which converts them, along with the luminance signal from the section 14, into red (R), green (G) and blue (B) color driving signals for application to a display operating at two times the original incoming line scan rate. A red amplifier 58 leads from the matrix to a red output 60; a blue amplifier 62 leads from the matrix 56 to a blue output 64;, and a green amplifier 66 leads from the matrix 56 to a green output 68.

The luminance section 14 is substantially identical to the chroma section 12, except that the single luminance signal component is not multiplexed. Thus, a luminance input 70 leads into an analog to digital converter 72 which quantizes the analog luminance into eight bit bytes at a 4Fsc quantization or sampling rate. The digitized luminance then passes into a scan line domain interpolator 74 which generates the (A+B)/2 interpolation pixels. When the jumper 20 is in place, the scan line domain (horizontal and vertical spatial domain) pixels pass directly to a two-to-one scan line compressor 76 which takes in the pixel bytes at the original scan line rate and which puts them out at twice the original rate. A digital to analog converter 78 then converts the line doubled luminance pixels into an analog data stream which flows into the color decoding matrix 56. As so far explained, the sections 12 and 14 are conventional and may be included within a single or a very few large scale integrated circuits at very low prime cost, such as $30.00 (U.S.) or less. The resultant spatial domain line doubler will work satisfactorily, particularly with small area displays. However, stationary vertical and diagonal transitions in the resultant picture display will be blurred, and flicker will be visible at large amplitude vertical and diagonal transitions.

The additive section 16 includes three connections 80, 82 and 84 from the luminance section 14. The connection 80 is a bridging connection, and the connections 82 and 84 provide a series connection which is bypassed when the jumper 20 is in place. The connections 80, 82 and 84 are shown with plugs and jacks to denote that the entire circuit 16 may be optionally installed as a module. Alternatively, and most preferably, all of the circuitry of the sections 12, 14 and 16, except for the field memory units 22 and 24, is contained in a single VLSI circuit chip. Thus, in practice, the spatial domain (two dimension) line doubler comprising the sections 12 and 14 may be expanded to a spatial/temporal domain (three dimension) line doubler 10 merely by adding the field memory modules 22 and 24, and removing the jumper 20. (While a jumper is depicted in FIG. 1, since the lines 82 and 84 are eight bits wide, eight bit digital path switches or multiplexers are a preferred implementation of the jumper. The multiplexers may be controlled by a single bit jumper.)

A present field F0 signal on the bus 80 enters the first field delay 22 and also enters a motion detector, low pass filter and rectifier 110. A one field (262 line) delayed signal F1 extends from the first field delay 22 to the second field (263 line) delay 24 over a bus 86. The bus 86 also leads into a detail subtractor circuit 88.

The detail subtractor circuit 88 includes a magnitude comparator circuit 90 which compares the magnitudes of a byte on the bus 82 with a byte on the bus 86 and generates and puts out an add/subtract bit over a line 96. The logic signal on the line 96 controls operation of an arithmetic logic unit (ALU) 92 within the detail subtractor circuit 88, and the add/subtract logic signal on the line 96 also controls operation of another ALU 108 providing a detail correction adder/subtractor circuit. The vertical detail subtractor ALU 92 generates subtraction pixels based upon the F0 and F1 co-located pixels so that the extra pixel components added by the spatial domain interpolation circuit 74 (leading to transition fuzziness and flickering) are subtracted at the detail correction adder/subtractor circuit 108. In practice, the ALU 92 subtracts the smaller input byte from the larger input byte, based upon the logical value put out by the magnitude comparator 90. Before reaching the circuit 108, the vertical details pixels from the ALU 92 go to a motion subtractor circuit 98 via a bus 94.

The four most significant bit positions of the bus 94 enter a second magnitude comparator 100 which is located within the motion subtractor circuit 98. The second magnitude comparator circuit 100 compares the four most significant bits of the signal on the bus 94 with four bits on a motion control bus 116 coming from motion signal circuits 110, 112 and 114. Basically, the motion signal circuits 110, 112 and 114 compare the F0 and F2 (one frame delayed) pixels to determine whether the pixels are in motion or are stationary within the picture signal. The result of the comparison is a one bit control signal on a line 101 which controls operation of an ALU 102 within the motion subtractor circuit 98. If the detail four most significant bits are greater than the four bits on the motion control bus 116, the ALU 102 puts out the detail bits minus the motion bits. If the detail four most significant bits are less than the four bits on the motion control bus 116, the ALU puts out a null value (zero).

The detail correction adder/subtractor ALU 108 is controlled by the same magnitude comparator 90 as controls the vertical detail subtractor ALU 92. The signal on the control line 96 causes the unsigned vertical detail to be added or subtracted as required in function of detected input magnitude change.

Figure 2:
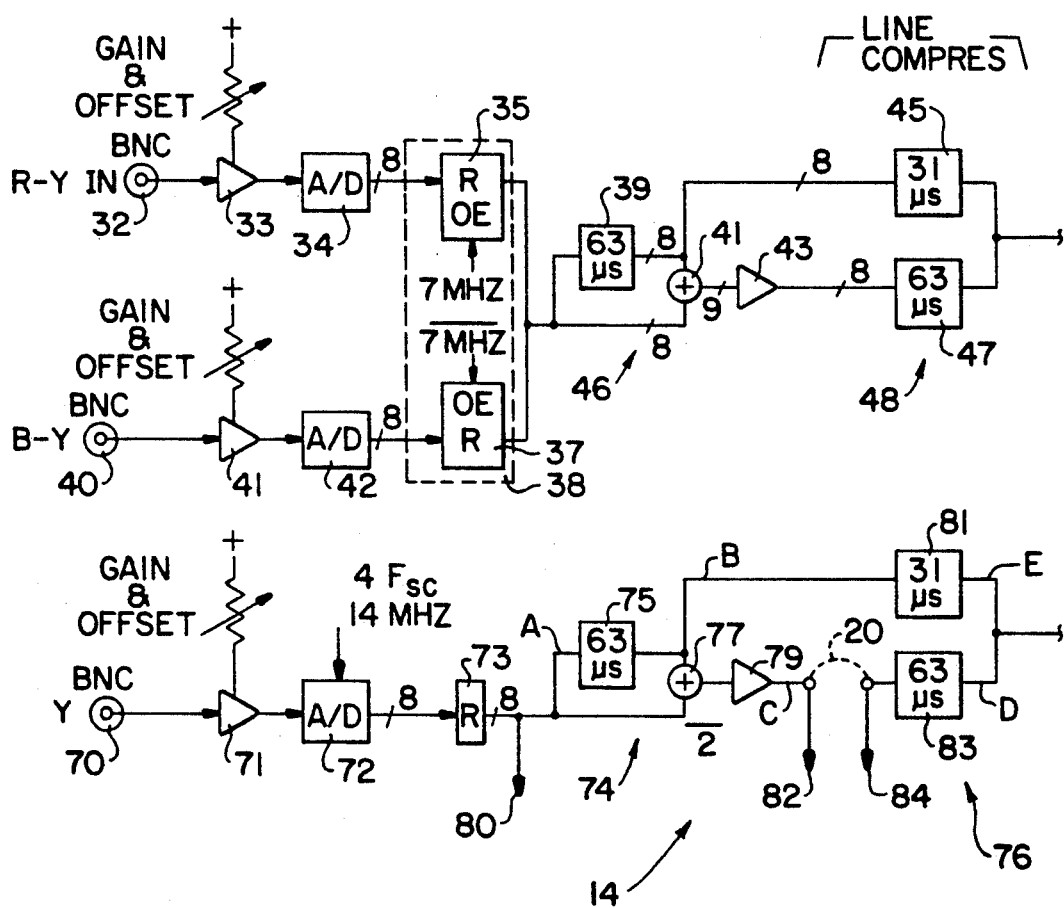
FIG. 2 is a more detailed block diagram of a main-path intra-field line doubler portion of the FIG. 1 circuit for both chroma and luminance.
Figure 2:
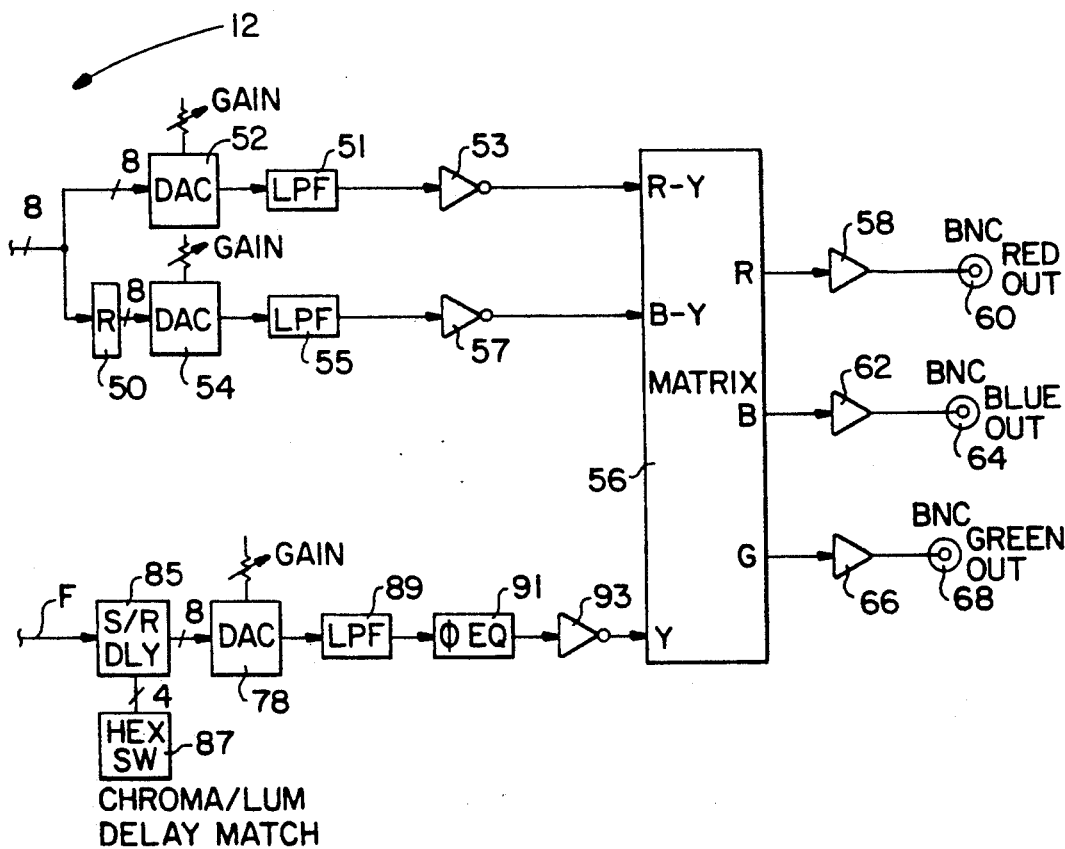

The circuitry of the spatial domain chroma/luminance line doubler comprising sections 12 and 14 is shown in greater detail in FIG. 2. Therein, gain and offset amplifiers 33, 41 and 71 are respectively in series between input 32 and A/D 34; input 40 and A/D 42; and, input 70 and A/D 72. The multiplexer 38 is comprised of two registers 35 and 37 clocked at the 2Fsc rate. The register 35 is clocked at 2Fsc true, while the register 37 is clocked by a logical complement of 2Fsc. The chroma line interpolator 46 includes a one line (63 microsecond in NTSC) delay 39 and a summing junction 41 which adds pixel bytes from two adjacent scan lines together (A+B). A one-half gain amplifier 43 from the output of the summer 41 provides the (A+B)/2 average output. The original pixel bytes are clocked into a delay 45 having a delay equal to one half of the original scan line period (e.g. 31 microseconds in the NTSC signal format) at the original byte clocking rate 4Fsc on the line 36, and are clocked out at the line doubled clocking rate 8Fsc on the line 31. The interpolated pixels are clocked into a delay 47 having a delay equal to the original scan line period (e.g. 63 microseconds in the NTSC signal format) at the original clock rate 4Fsc, and they are clocked out of the delay 47 at the line doubled scan rate 8Fsc. The color pixels are demultiplexed by a register 50 which operates at the 2Fsc rate. Low pass filters 51 and 55 remove any aliasing and quantization errors or residues following the DACs 52 and 55, and inverting amplifiers 53 and 57 provide gain control and impedance matching for the matrix 56.

Similarly, the luminance path includes a gain and offset amplifier 71 between the input 70 and A/D 72. A register 73 provides delay matching to match chroma path delays. The line interpolator includes a delay 75 having a delay equal to an original scan line period (e.g. 63 microseconds for NTSC) and a summer 77. Original pixels are clocked into a delay 81 at the original clock rate 4Fsc and are clocked out at the line doubled rate 8Fsc. The delay 81 has a delay equal to one half the original scan line delay. The interpolation pixels from the adder 77 (A+B) are halved in amplitude by a half gain adder 79 to provide the desired average (A+B)/2. The output bus from the half gain adder 79 leads to the bus 82 and jumper 20. The bus 84 (and jumper 20) lead into a delay 83 which takes pixel bytes in at the original clocking rate 4Fsc and clocks them out at the line doubled rate 8Fsc. A luminance/chroma delay match circuit includes a shift register 85 and a hex switch 87 which enables a selectable number of clock delays to be inserted in the luminance path appropriate to match delays occurring in the chroma path incident to multiplexing, etc. The respective gains of the DACs 52, 54 and 78 are adjustable. A low pass filter 89, phase equalizer 91 and inverting amplifier 93 are located between the DAC 78 and the color matrix 56.

Figure 3:
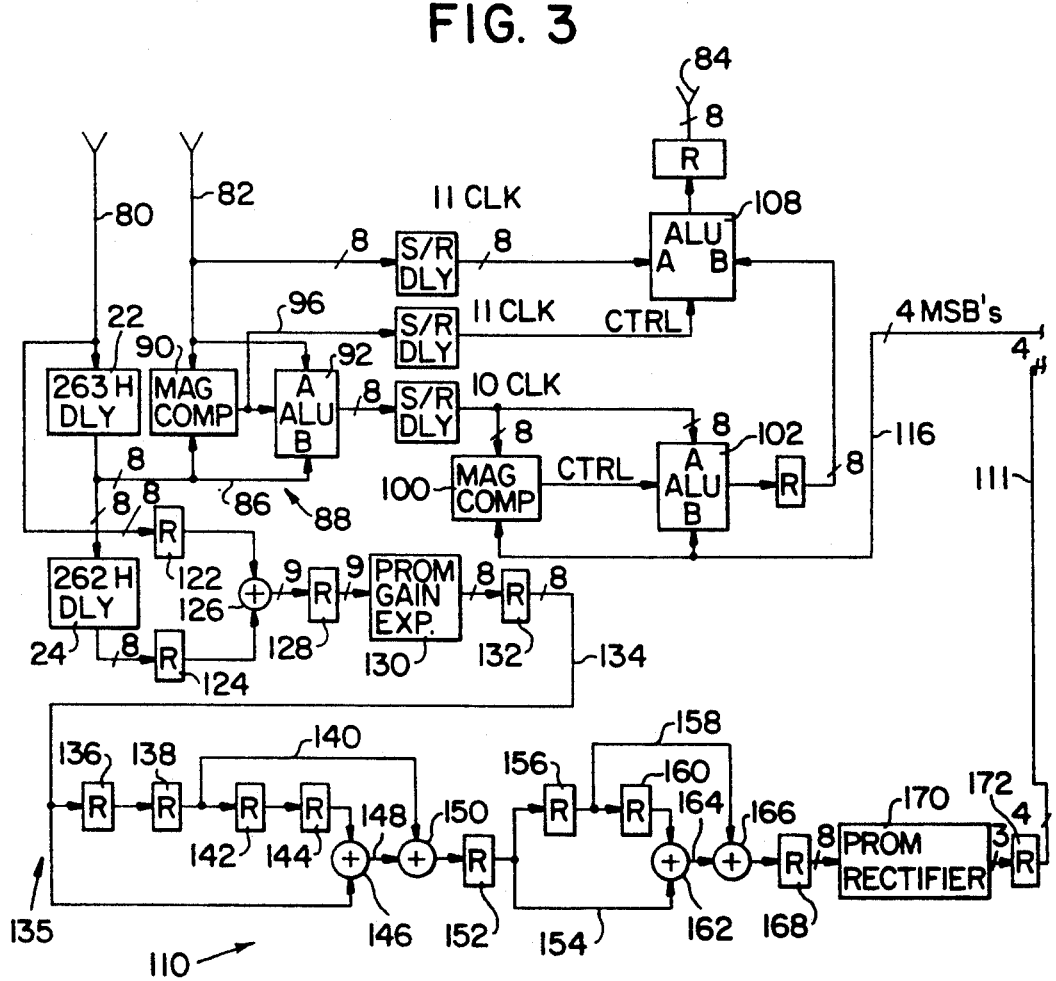
FIG. 3 is a more detailed block diagram of a modular, expansible additive process path which, when added to the FIG. 2 main-path circuit, extends the FIG. 2 circuit to full capability as three dimensional scan line doubler.
Figure 3:
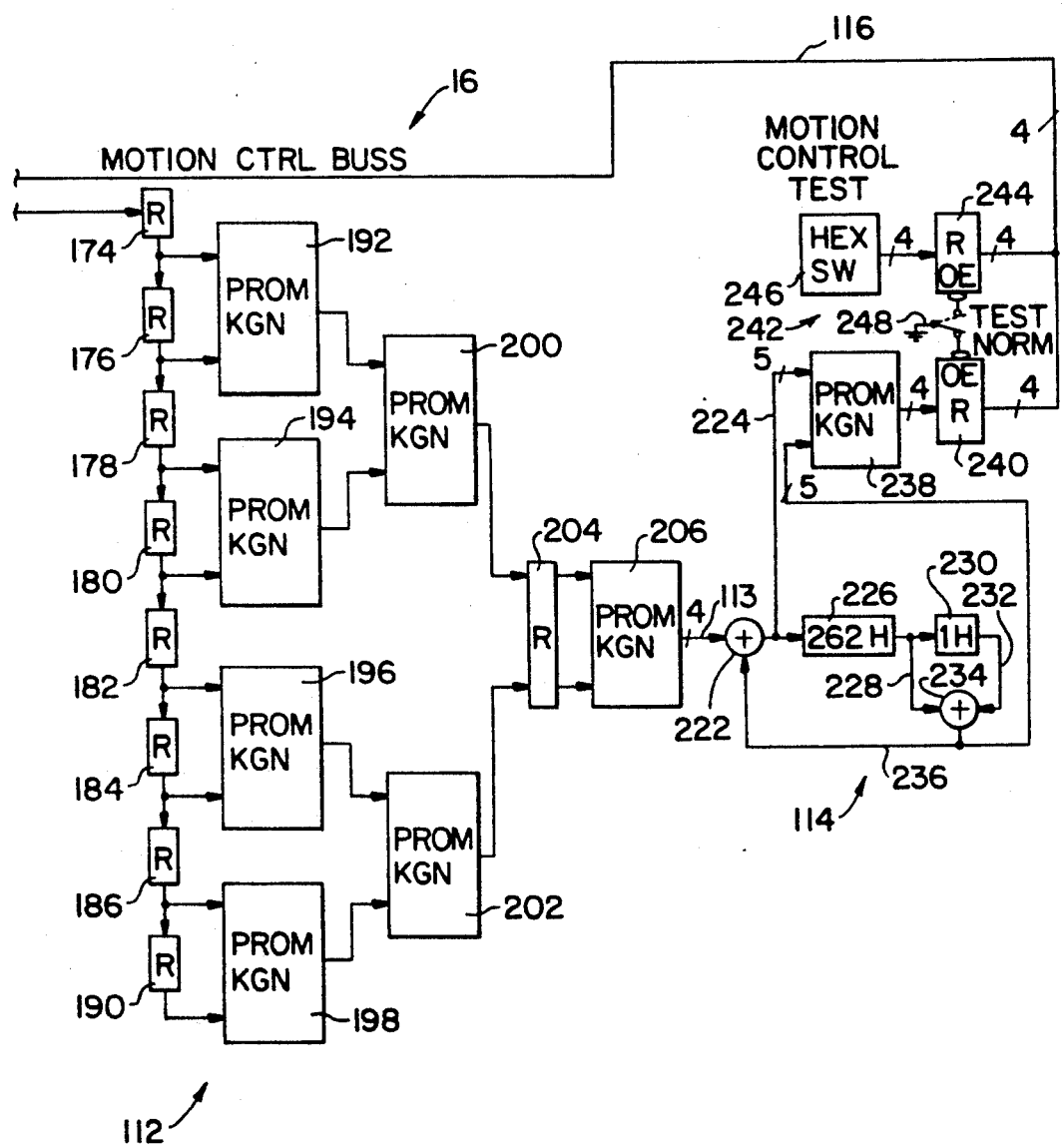

Turning now to FIG. 3, further details of the additive circuit section 16 are shown. The motion detection circuit 110 includes two registers: a register 122 connected to the bus 80, and a register 124 connected to the output of the second field delay circuit 24. These registers feed a summing circuit 126 which takes the difference and puts out an eight bit value and a sign bit to a latch 12. A PROM 130 functioning as a dynamic range or gain expansion circuit expands the gain of the incoming difference signal up to certain saturation values after which gain remains constant and puts out a gain expanded motion signal to a latch 132. For example, if a zero motion value equates to digital 128, then plus or minus digital 31 motion values are expanded to plus or minus 128 values, the full dynamic range of the 8 bit video quantization. An output from the motion detector portion of the circuit 110 is provided on a bus 134.

The bus 134 leads to a digital low pass filter 135 following a finite impulse response architecture which spreads out a pulse over time. This process reduces the level of the pulse, and therefore the gain expander PROM 130 preemphasizes the motion control values in order to make up for the losses occurring in the low pass filter. The digital low pass filter 135 includes a series of registers 136, 138, 142, 144, 152, 156 and 160, and summing circuits 146, 150, 162 and 166, configured as shown in FIG. 3. The operation of these circuit elements establishes a series of zeros located at and above the color subcarrier frequency Fsc, thereby eliminating any high frequency elements (including noise) from the motion control.

The low pass filtered motion control signal is then latched in a latch 168 and applied to a PROM 170 configured to perform a full wave rectification function upon the motion control signal. This "rectification" removes the sign of the motion control signal irrespective of direction of movement of the pixels within the picture image signal. A register 172 latches the output of the rectifier PROM 170 and puts out the low pass filtered, full wave rectified motion control signal on a bus 111 leading to the horizontal expansion circuit 112.

The horizontal expansion circuit 112 includes a chain of registers 174, 176, 178, 180, 182, 184, 186 and 190 as shown in FIG. 3. Bus taps from the registers lead into "keep greater number" (KGN) PROMs 192, 194, 196 and 198. Outputs from PROMs 192 and 194 feed into a KGN PROM 200, and outputs from PROMs 196 and 198 feed into a KGN PROM 202. Outputs from the KGN PROMs 200 and 202 are concentrated in a register 204 and applied to a final KGN PROM 206 which provides an output over a bus 113.

The function of the horizontal expansion circuit 112 is to generate a motion control signal which expands in time in the horizontal domain to embrace the motion transition and an area along the line scan structure embracing the motion transition as detected from frame to frame. This function is further explained in conjunction with FIG. 9 hereinafter.

The vertical/temporal expansion circuit 114 includes a field domain summing junction 222 having an output bus 224 leading into a 262 line (one field) delay 226. The field delay 226 has an output bus 228 leading to a one line delay 230. The one line delay 230 has an output bus 232 leading to a line domain summing circuit 234 which takes a difference between the motion control pixel bytes on successive scan lines and provides an output on a bus 236. The bus 236 feeds back into the field domain summing junction 222 which thereby takes a field difference between the incoming motion control pixel bytes and field plus (A+B)/2 delayed pixel bytes. This arrangement establishes a field recirculation circuit for expanding the motion control in the vertical and temporal domains, as discussed hereinafter in connection with FIG. 10. The values on the buses 224 and 236 are applied to address a KGN PROM 238 which results in vertical/temporal domain expansion of the motion control signal. An output from the PROM 238 is held in a register 240 and then put out as a four bit (16 level) control signal on the bus 116. A test circuit 242 including a register 244, motion control setup switch 246 and test/operate switch 248 are provided to test operation of the motion control additive circuitry 16.

Figure 4:
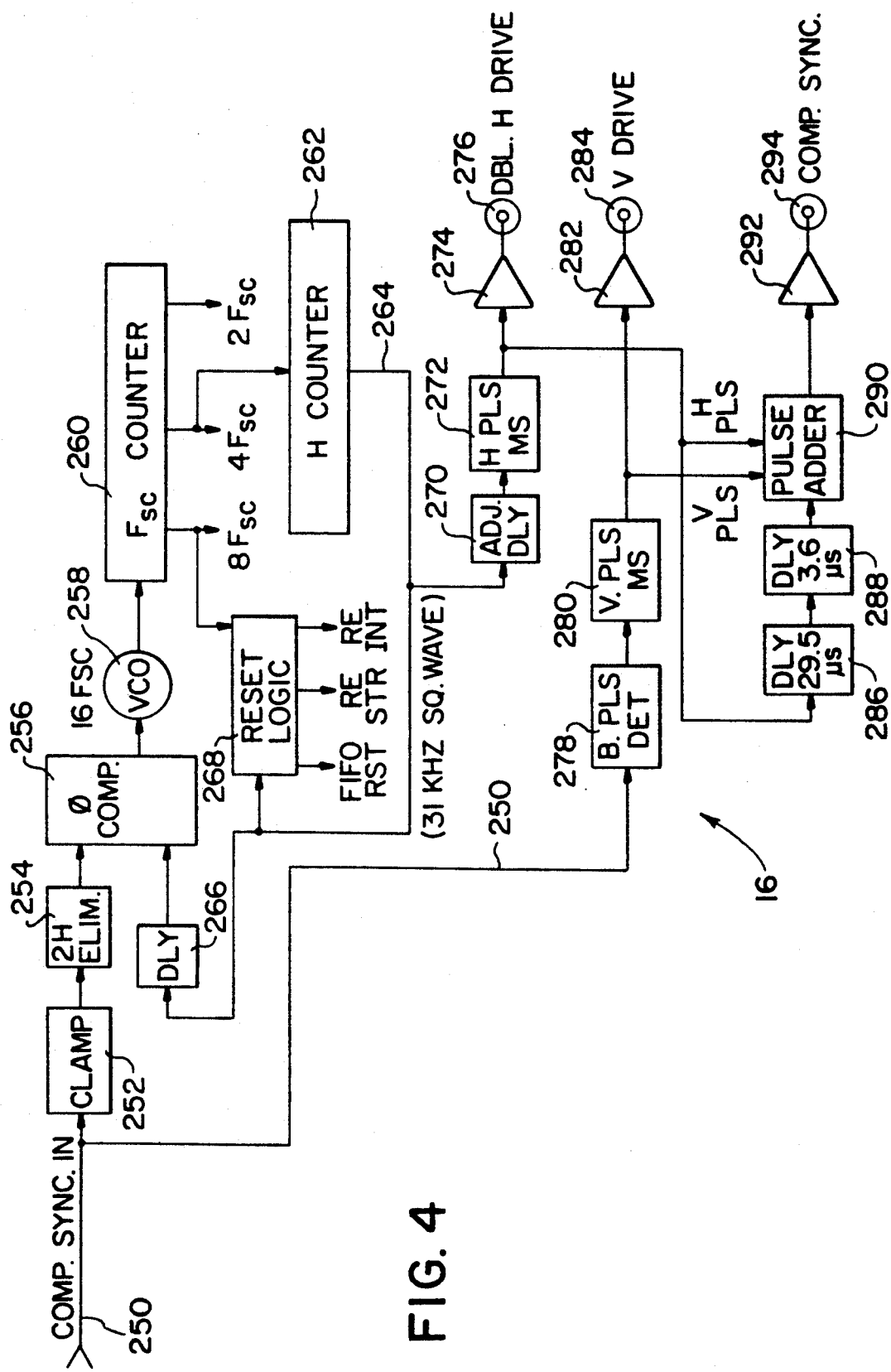
FIG. 4 is a more detailed block diagram of a timing module of the FIG. 1 circuit.

The timing circuitry 18 is shown in greater detail in FIG. 4. A composite sync input line 250 receives composite sync in analog form from detector/sync separator elements of the television receiver. The sync signal is passed through a clamp circuit 252 and a notch filter 254 to eliminate the second harmonic of the horizontal line scan component. The filtered sync then is applied as one input to a phase comparator 256 of a phase locked loop which further includes a voltage controlled oscillator operating e.g. at 16Fsc, a Fsc counter 260 which generates the 2Fsc, 4Fsc and 8Fsc clocking signals, and a horizontal counter 262 which generates a horizontal clocking signal at the scan line doubled rate (31 KHz in NTSC) and puts this signal out over a line 264. The signal on the line 264 passes through a delay match 266 and is applied as a second input to the phase comparator 256 to complete the phase locked loop. The phase comparator 256 locks the loop to the phase and frequency of the incoming composite sync in conventional fashion.

The double H clocking pulses on the line 264 are also applied to a reset logic circuit 268 which generates reset signals for the FIFO registers 45, 47, 81 and 83, and strobe and interrupt signals for the registers.

The double H clocking signal on the line 264 is also applied through a delay adjust circuit 270 to a horizontal pulse generator 272 which generates horizontal sync pulses at the scan line doubled rate. These double H sync pulses are amplified in a driver 274 and put out at a port 276.

The composite sync on the line 250 is also passed through a blanking pulse detector 278 and a vertical interval pulse generator 280 which generates and puts out vertical sync, including the blanking pulses, through a driver 282 to a vertical drive port 204.

Outputs from the horizontal pulse generator 272 and the vertical pulse generator 280 are applied through delay circuits 286 and 288 for delaying the signals by one half of the original scan line period and also directly to a pulse adder circuit 290. The one half H delayed horizontal pulses and the undelayed horizontal pulses and vertical interval pulses are combined in the adder circuit 290 and put out via a driver 292 to a composite output port 294.

Figure 5A:
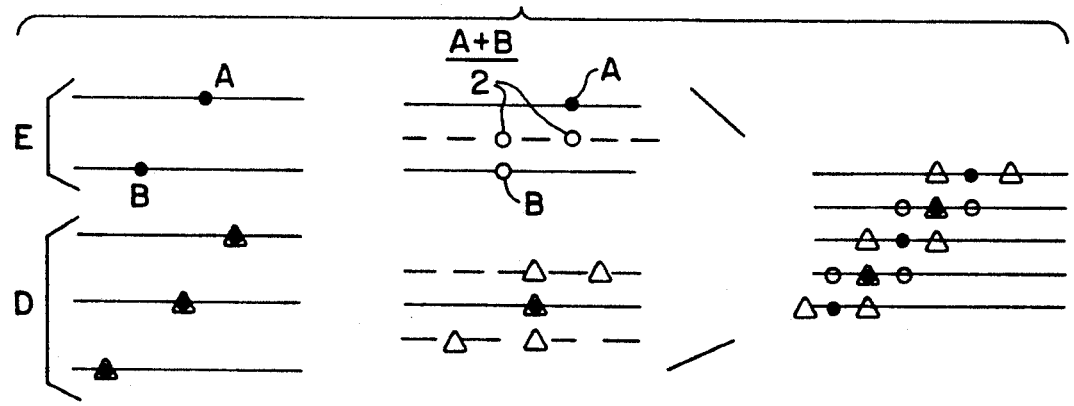
FIG. 5A is a series of graphs illustrating operation of the FIG. 2 circuit.

FIG. 5A illustrates operation of the two dimensional (spatial domain) line doubler (either the chroma doubler 12 or the luminance doubler 14 with the jumper 20 in place). At the left of FIG. 5A there are five segments of adjacent scanning lines, two belonging to an even field (E), and three belonging to an adjacent odd field (O). A diagonal transition, denoted by solid black dots in the even field, and by solid black triangles in the odd field, is depicted. The middle portion of FIG. 5A illustrates the line averaging process as yielding interpolation samples which are open circles in the even field and open triangles in the odd field. The right of FIG. 5A illustrates the resultant picture display in which the even and odd fields are overlaid, as occurs with the eye-brain perception/integration process of the viewer. The transition is not only widened from one pixel to three pixels, but a zig-zag flicker occurs which is perceptible at the frame rate (30 Hz). This flicker occurs because the open body interpolation pixels have only one half of the amplitude of the solid body pixels creating a contrast band along the transition.

Figure 5B:
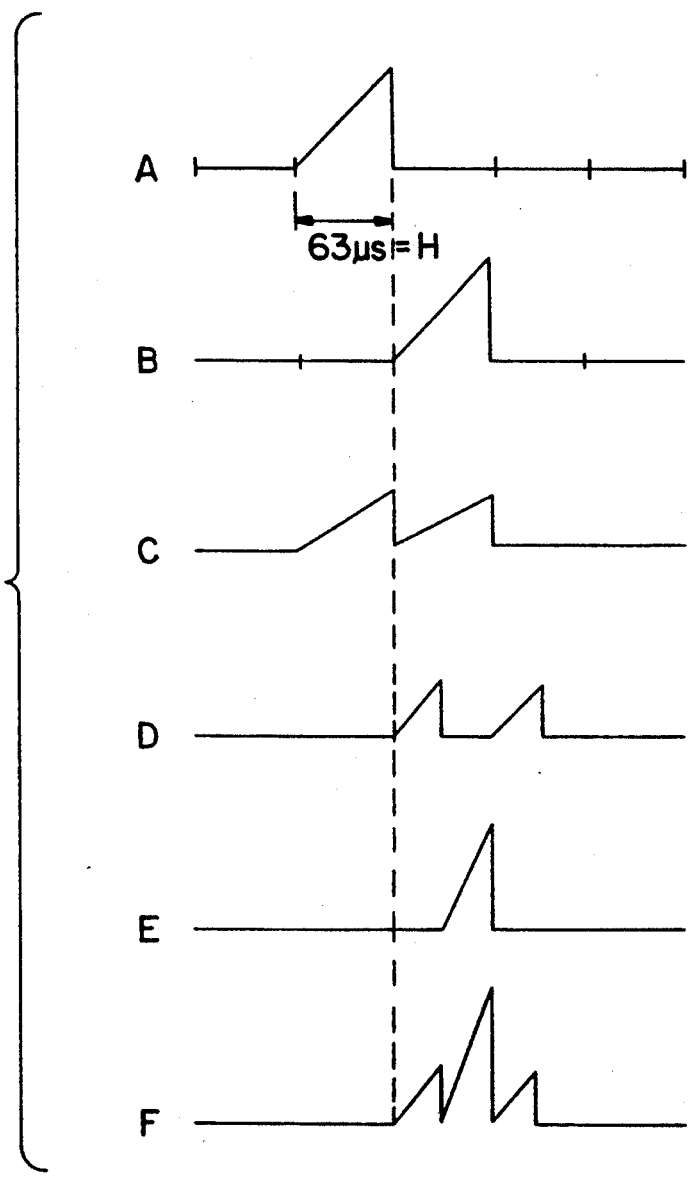
FIG. 5B is a series of waveform graphs taken at noted locations within the FIG. 2 circuit.

FIG. 5B illustrates action of the line interpolator 74 and 2:1 compression circuit 76 when a black to white ramp signal is applied to one scan line at the luminance input 70. The various signals graphed in FIG. 5B are lettered with letters marking circuit locations within FIG. 2.

Figure 6:
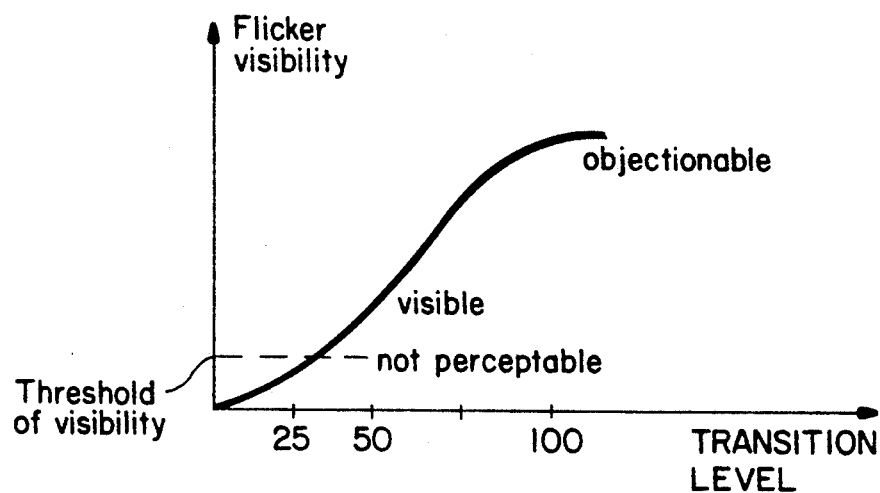
FIG. 6 is a graph of flicker visibility as a function of transition level for the FIG. 2 circuit.

FIG. 6 illustrates flicker visibility as a function of vertical or diagonal transition level. FIG. 6 should be understood as a conceptual representation of a very nonlinear relationship between IRE level of the transition, and the perception of flicker. What appears to be true from observation is that up to about 25 IRE units of transition amplitude, flicker is not usually perceptible at all. From 25 to 50 IRE units, the threshold of perception is usually reached, and from 50 to 100 IRE units of transition amplitude, the flicker progresses from visible to very objectionable. Of course, actual data will depend upon the contrast capability and persistence of the particular display device, and the viewer's subjective sensitivity to flicker. Suffice it to say, with high contrast, short persistence, large area displays, flicker becomes an objectionable annoyance with the two dimensional line doubler structure 14.

The FIG. 7 block diagram vastly simplifies the FIG. 1 structure 10 in order to illustrate even more clearly principles and advantages of the present invention. It is to be seen in FIG. 7 that the system 10 includes a luminance main path 14 comprising the elements 72, 74 and 76, and the buses 80, 82 and 84. Without more, the resultant very low cost line doubler provides interpolation pixels form the line interpolator in accordance with (A+B)/2 as illustrated in FIG. 5, with the attendant drawbacks already noted.

A second and additive path 16 connects to the main path and essentially includes the field memory units 22 and 24, a subtractor 88, a control 98 and a summing junction 108 operating under the control of the motion detection and control generation circuits 110, 112, 114.

The field memory unit 22 is set to provide a delay of 263 lines, which is convenient in the sense that it is an integral number of scan lines at the original scan rate. This delay represents one field plus one half scan line (a field being 262.5 scan lines). The delay of the field memory unit 22 is set to be exactly in accord with the delay of the line interpolation circuit 74, so that the output of the memory unit 22 represents truly the one field delayed pixel (F1 pixel) at the same spatial location of the pixel average (A+B)/2 being generated by the line interpolator 74.

The subtractor 88 generates and puts out a function {F1 minus [(A+B)/2]F0} to the control circuit 98. When there is no motion, the control passes this function to the summing junction 108, and the summing junction sums this function with the main path function of [(A+B)/2]F0, or

[(A+B)/2]F0−[(A+B)/2]F0+F1.

The line interpolation pixels therefore cancel in the summing junction, leaving only the prior field pixel F1. In the case of a stationary diagonal transition, this operation results in a transition display which is very smooth and sharp, as shown in the line doubled display graphed in FIG. 8A and which is undistorted by any interpolation artifacts.

When there is motion, the output from the control 98 is essentially zero, and there is nothing additively to cancel from the main path. The result is the main path output [(A+B)/2]F0, having for a diagonal transition an appearance graphed in the line doubled display graph of FIG. 8B.

The motion control circuitry depicted in FIGS. 1 and 3 and described in conjunction therewith preferably implements and applies a variable threshold in series with the subtractor circuit 88, the threshold level being controlled by the magnitude of the motion control signal put out by the motion control circuits 110, 112 and 114, such that the threshold is set at a high level when the motion control signal has a high value, and the threshold is set at a low level when the motion control signal has a low value.

In practice this arrangement is most desireable and results in a smoothing appearance, preventing an overall picture image from instantly becoming fuzzy or blurry when a slow or small area motion is detected. The process of detecting motion some spurious fine picture detail type signals. If real fine picture details are present, and if the motion is very slow or limited in area, the fine picture details (one field delayed pixels) will be selected in lieu of average pixels, as the motion control threshold will be low. As motion increases in speed or area, or both, the switchover threshold increases such that some fine picture details will now not be available for interpolation. Eventually, with a high motion level the switchover is complete, and only averaged pixels will be put out as interpolation pixels. This approach of varying the switchover level in function of motion results in a smoothed, gradual, non-abrupt switchover from field-delayed spatially aligned pixels (fine picture detail) to the average pixels while minimizing onset of perceptible flicker.

When the circuit 16 is not in place, the reduced but very useful functionality of the very low cost main path 14 remains unaffected. When the additive modular circuit 16 is in place, a significantly improved line doubler 10 results.

While the line doubling algorithms implemented by the improved line doubler 10 are known in the prior art, a significant contribution of the present invention is the appreciation that the circuit 16 only manipulates the difference, i.e. the flicker component, present in the main path. The main path is essentially passive, meaning that it operates the same way whether there is motion or no motion. The additive path removes the line interpolator artifacts where the picture image is stationary and does not remove the line interpolator artifacts where there is motion in the picture image.

One clear advantage of manipulating only the interpolation difference signal by the additive circuit 16 is that the difference signal is very low level. Since it is a low level signal that is being manipulated, the circuit 16 may make interpolation errors or mistakes without generating unacceptable artifacts in the resultant display. Also, the detection of motion in every instance is not essential to satisfactory performance. Accordingly, the additive circuit 16 is set to err on the side of the presence of motion, whether or not the particular picture activity is actually in motion. The only down side to this approach is the occasional and slight flicker or softness of vertical or diagonal transition edges.

The control 98 can be set to impose a threshold, so that e.g. there is no switch to the field delayed pixel until the flicker level (FIG. 6) reaches the threshold of perception, i.e. about 25 IRE units.

The motion detection circuit 110 starts at the onset of motion, but it stops one field later than the last motion condition is present. A full frame is needed for motion detection, rather than a single field. Otherwise, vertical transitions from field to field may be confused for motion in the picture image. Ideally, the motion control should start before the onset of motion, and should stop after the motion condition has passed, thereby centering the motion condition within the motion control window. However, we have discovered that so long as the motion control is not started after the onset of motion, there is very little noticeable drawback.

The motion detection circuit 110 also includes a digital low pass filter which is designed to have a zero at the color subcarrier frequency Fsc and other zeros above that frequency, to eliminate noise and high frequency picture elements, adding to the robustness of the motion control signal. The full wave rectifier function removes the sign of the motion from frame to frame, so that the motion control signal operates as an absolute value.

As diagrammed in FIG. 9, the horizontal expansion circuit 112 delays the motion control signal by a plurality of Fsc clock intervals, such as 1Fsc, 2Fsc, 3Fsc and 4Fsc. The variously delayed motion control signals are then fed into the "keep greatest number" arrays, which results in a horizontal domain expanded motion control signal shown as "motion out" in FIG. 9. By providing controlled register delays in the main path 14 (and delay matches in the additive path 16) it is practical to bracket detected motion conditions by the horizontally expanded "motion out" control signal put out by the circuit 112.

The vertical/temporal expansion circuit 114 carries out vertical, temporal domain expansion of the motion control signal by implementing a 262.5 line recirculation loop with the elements 222, 226, and 234. This approach has been described within a noise reduction system in co-inventor Faroudja's prior, commonly assigned U.S. Pat. No. 4,670,775, the disclosure of which is hereby incorporated by reference. As shown in FIG. 10A, field recirculation causes an expansion or averaging in scan lines as field intervals progress. A single line expands to three lines, which expands to five lines, etc. FIG. 10B shows that the motion expansion vector extends in a plane including the vertical and temporal (T) dimensions. FIG. 10C shows the motion control input to the circuit 114, and FIG. 10D shows the vertical/temporal expansion at the end of the input motion interval as a decay rolling off over a plurality of fields. This approach, previously demonstrated to be efficacious for chroma noise reduction, works very well for developing a motion control signal having a robustness and high signal to noise ratio, and it also desirably results in a control which errs in favor of motion, rather than non-motion. Thus, the F1 pixel is substituted for the line interpolation average, only when motion clearly is not present in the picture image.

In preferred structural form, all of the circuitry of the improved line doubler 10, except for the field memory units 22, 24 and 226, for example, is contained in a single very large scale integrated circuit chip. To upgrade the line doubler from the basic unit 14 to the enhanced unit 10, the field memories 22, 24 and 226 are plugged in, and the jumper 20 is effectively disconnected. In practice, the presence of the field memory units 22, 24 and 226 is detected, and the "jumper" 20 is automatically, electrically removed.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A field memory expansible scan line doubler for a television receiver comprising:
   an input for receiving a video signal at a first scan rate,
   an output for providing a video signal at a second scan rate twice the first scan rate,
   a main path leading between the input and the output and including:
      line interpolation means for interpolating pixels in accordance with the relation (A+B)/2 wherein A is a first location along a first scan line, and B is a second location along a second scan line substantially aligned vertically with the first location and for putting out line interpolated pixels in accordance with said relation,
   two-to-one time compression means for compressing original and interpolation scan lines into a scan line doubled format, and
   optional additive path insertion means between the line interpolation means and the two-to-one line compression means, and
   removable connecting path means bridging the optional additive path insertion means.

2. The scan line doubler set forth in claim 1 wherein the removable connecting path means is opened and further comprising an additive signal processing path connected at the optional additive path insertion means, the additive signal processing path including:
   field delayed pixel extraction means for providing one field delayed pixels substantially spatially coincident with line interpolated pixels located spatially between the first and second scan line,
   control means for generating a control in relation to detection of motion within the main path video signal,
   combining means responsive to the control for adding to the main path a function of the one field delayed pixels minus the line interpolated pixels in accordance with the said relation,
   whereby when the optional path is connected, the scan line doubler operates in the horizontal, vertical and temporal domain, and when the optional path is not connected, the scan line doubler operates in the horizontal and vertical domains.

3. The scan line doubler set forth in claim 2 wherein the additive path includes plural plug-in field memory units.

4. The scan line doubler set forth in claim 3 wherein when the plural plug-in field memory units are installed in the additive path, the removable connecting path means is automatically opened across the optional additive path insertion means.

5. The scan line doubler set forth in claim 2 wherein the combining means comprises subtractor means for generating a function of one field delayed pixels minus the line interpolated pixels in accordance with the said relation, and adder means for adding the function to the main path in accordance with the absence or presence of the control.

6. The scan line doubler set forth in claim 2 wherein the control is a one bit binary logic function.

7. The scan line doubler set forth in claim 2 wherein the control is a multi-step control whose magnitude varies in relation to detected magnitude of motion within the video.

8. The scan line doubler set forth in claim 2 wherein the control is generated in function of detection of transition magnitude within the video signal.

9. The scan line doubler set forth in claim 2 wherein the motion control is not put out for transitions in motion unless they are above a predetermined threshold.

10. The scan line doubler set forth in claim 9 wherein the threshold is established to vary up to approximately 25 IRE units of transition amplitude within the video signal, after which it remains fixed.

11. The scan line doubler set forth in claim 1 wherein the main path comprises a luminance path, and further comprising:

an input for receiving plural chroma signal components at a first scan rate, an output for providing chroma signal components at a second scan rate twice the first scan rate, a chroma line doubling path leading between the input and the output and including:

chroma line interpolation means for interpolating chroma pixels in accordance with the relation (A+B)/2 wherein A is a first location along a first scan line, and B is a second location along a second scan line substantially aligned vertically with the first location and for putting out line interpolated pixels in accordance with said relation, two-to-one line chroma scan line compression means for compressing original and interpolation chroma scan lines into a scan line doubled format and for supplying said compressed original and interpolation chroma scan lines to said output.

12. The scan line doubler set forth in claim 1 further comprising analog to digital converter means connected to said input, and digital to analog converter means connected to said output, and wherein said main path comprises digital electronics.

13. The scan line doubler set forth in claim 2 wherein said main path further comprises analog to digital converter means connected to said input, and digital to analog converter means connected to said output, and wherein said main path and said additive path comprise digital electronics.

14. The scan line doubler set forth in claim 12 wherein said additive path comprises plural plug-in digital field memory units.

15. The scan line doubler set forth in claim 2 wherein said control means includes motion detection means.

16. The scan line doubler set forth in claim 2 wherein said additive path includes two tandem-connected plug-in field memory units, a first memory unit providing 263 line period delay at the first scan rate, and a second memory unit providing 262 line period delay at the first scan rate, the first memory unit included within the field delayed pixel extraction means for providing one field delayed pixels substantially spatially coincident with line interpolated pixels located spatially between the first and second scan line; and, the first and second memory units included within the control means for detecting motion in the video signal.

17. The scan line doubler set forth in claim 2 wherein the control means comprises motion detection means and full wave rectifier means to remove the sign of the control in function of direction of motion detected in the video signal.

18. The scan line doubler set forth in claim 17 wherein the motion detection means further includes low pass filter means.

19. The scan line doubler set forth in claim 17 wherein the control means includes horizontal domain expansion means following the motion detection means for expanding the control in the horizontal dimension.

20. The scan line doubler set forth in claim 17 wherein the control means includes vertical/temporal domain expansion means following the motion detection means for expanding the control in the vertical/temporal dimensions.

21. The scan line doubler set forth in claim 2 wherein said combining means combines a result of addition of said one field delayed pixels minus said line interpolated pixels, said result being subjected to a threshold function circuit means for applying a threshold function varying in relation to magnitude of said control put out by said control means such that a high threshold level is applied when magnitude of the control is high, and a low threshold is applied when magnitude of the control is low.

22. A scan line doubler for a television receiver comprising:

an input for receiving a video signal at a first scan rate, an output for providing a video signal at a second scan rate twice the first scan rate, a main path leading between the input and the output and including:

line interpolation means for interpolating pixels in accordance with the relation (A+B)/2 wherein A is a first location along a first scan line, and B is a second location along a second scan line substantially aligned vertically with the first location and for putting out line interpolated pixels in accordance with said relation, two-to-one time compression means for compressing original and interpolation scan lines into a scan line doubled format, and additive path signal processing means between the line interpolation means and the two-to-one line compression means including:

field delayed pixel extraction means for providing one field delayed pixels substantially spatially coincident with line interpolated pixels located spatially between the first and second scan line, control means for generating a control in relation to detection of motion within the main path video signal, combining means responsive to the control for adding to the main path a function of the one field delayed pixels minus the line interpolated pixels in accordance with the said relation.

23. The scan line doubler set forth in claim 22 wherein said combining means combines a result of addition of said one field delayed pixels minus said line interpolated pixels, said result being subjected to a threshold function circuit means for applying a threshold function varying in relation to magnitude of said control put out by said control means such that a high threshold level is applied when magnitude of the control is high, and a low threshold is applied when magnitude of the control is low.

24. The scan line doubler set forth in claim 22 wherein the combining means comprises subtractor means for generating a function of one field delayed pixels minus the line interpolated pixels in accordance with the said relation, and adder means for adding the function to the main path in accordance with the absence or presence of the control.

25. The scan line doubler set forth in claim 22 wherein the control is a one bit binary logic function.

26. The scan line doubler set forth in claim 22 wherein the control is a multi-step control whose magnitude varies in relation to detected magnitude of motion within the video.

27. The scan line doubler set forth in claim 22 wherein the control is generated in function of detection of transition magnitude within the video signal.

28. The scan line doubler set forth in claim 22 wherein the motion control is not put out for transitions in motion unless they are above a predetermined threshold.

29. The scan line doubler set forth in claim 22 wherein the main path comprises a luminance path, and further comprising:

an input for receiving plural chroma signal components at a first scan rate, an output for providing chroma signal components at a second scan rate twice the first scan rate, a chroma line doubling path leading between the input and the output and including:

chroma line interpolation means for interpolating chroma pixels in accordance with the relation (A+B)/2 wherein A is a first location along a first scan line, and B is a second location along a second scan line substantially aligned vertically with the first location and for putting out line interpolated pixels in accordance with said relation, two-to-one line chroma scan line compression means for compressing original and interpolation chroma scan lines into a scan line doubled format and for supplying said compressed original and interpolation chroma scan lines to said output.

30. The scan line doubler set forth in claim 22 further comprising analog to digital converter means connected to said input, and digital to analog converter means connected to said output, and wherein said main path comprises digital electronics.

31. The scan line doubler set forth in claim 22 wherein said main path further comprises analog to digital converter means connected to said input, and digital to analog converter means connected to said output, and wherein said main path and said additive path comprise digital electronics.

32. The scan line doubler set forth in claim 31 wherein said additive path comprises plural plug-in digital field memory units.

33. The scan line doubler set forth in claim 22 wherein said control means includes motion detection means.

34. The scan line doubler set forth in claim 22 wherein said additive path includes two tandem-connected plug-in field memory units, a first memory unit providing 263 line period delay at the first scan rate, and a second memory unit providing 262 line period delay at the first scan rate, the first memory unit included within the field delayed pixel extraction means for providing one field delayed pixels substantially spatially coincident with line interpolated pixels located spatially between the first and second scan line; and, the first and second memory units included within the control means for detecting motion in the video signal.

35. The scan line doubler set forth in claim 22 wherein the control means comprises motion detection means and full wave rectifier means to remove the sign of the control in function of direction of motion detected in the video signal.

36. The scan line doubler set forth in claim 35 wherein the motion detection means further includes low pass filter means.

37. The scan line doubler set forth in claim 35 wherein the control means includes horizontal domain expansion means following the motion detection means for expanding the control in the horizontal dimension.

38. The scan line doubler set forth in claim 35 wherein the control means includes vertical/temporal domain expansion means following the motion detection means for expanding the control in the vertical/temporal dimensions.

* * * * *

UNITED STATES PATENT AND TRADEMARK OFFICE
CERTIFICATE OF CORRECTION

PATENT NO. : 5,159,451

DATED : October 27, 1992

INVENTOR(S) : Yves C. Faroudja, Charles A. Bialo

It is certified that error appears in the above-identified patent and that said Letters Patent is hereby corrected as shown below:

Column 14
  Line 10:  "two-to-one line" should be --two-to-one time--

Column 16
  Line 26:  "two-to-one line" should be --two-to-one time--

Signed and Sealed this

Twentieth Day of September, 1994

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,159,451
DATED : October 27, 1992
INVENTOR(S) : Yves C. Faroudja et al.

It is certified that error appears in the above-identified patent and that said Letters Patent is hereby corrected as shown below:

Column 15, line 15, "two-to-one line" should be --two-to-one time--;

Column 17, line 20, "two-to-one line" should be --two-to-one time--.

Signed and Sealed this

Eighth Day of November, 1994

Attest:

BRUCE LEHMAN

Attesting Officer    Commissioner of Patents and Trademarks